United States Patent
Erisman et al.

(10) Patent No.: US 7,493,045 B2
(45) Date of Patent: Feb. 17, 2009

(54) REAL TIME FIBER OPTIC MATRIX SWITCH INTERCONNECTION

(76) Inventors: David E. Erisman, X-COM Technologies, LLC, 12345-B Sunrise Valley Dr., Reston, VA (US) 20191; Douglas J. Jaeger, X-COM Technologies, LLC, 12345-B Sunrise Valley Dr., Reston, VA (US) 20191; Steven A. Renich, X-COM Technologies, LLC, 12345-B Sunrise Valley Dr., Reston, VA (US) 20191

( * ) Notice: Subject to any disclaimer, the term of this patent is extended or adjusted under 35 U.S.C. 154(b) by 835 days.

(21) Appl. No.: 10/901,357

(22) Filed: Jul. 29, 2004

(65) Prior Publication Data

US 2006/0024056 A1    Feb. 2, 2006

(51) Int. Cl.
*H04J 14/00* (2006.01)
(52) U.S. Cl. .................................. 398/76; 398/55
(58) Field of Classification Search ............ 398/47, 398/48, 49, 50, 51, 55, 56, 57, 70, 71, 72, 398/73, 76
See application file for complete search history.

(56) References Cited

U.S. PATENT DOCUMENTS

| | | | |
|---|---|---|---|
| 5,029,124 A * | 7/1991 | Leahy et al. | 710/105 |
| 5,197,097 A * | 3/1993 | Takahashi et al. | 398/155 |
| 5,661,583 A * | 8/1997 | Nhu | 398/141 |
| 6,023,752 A | 2/2000 | Huttle | 712/1 |
| 6,269,114 B1 | 7/2001 | Paterno | 375/224 |
| 6,275,864 B1 | 8/2001 | Mancusi et al. | 790/250 |
| 6,366,562 B1 | 4/2002 | Paterno | 370/247 |
| 6,426,952 B1 | 7/2002 | Francis et al. | 370/380 |
| 6,526,048 B1 | 2/2003 | Francis et al. | 370/380 |

* cited by examiner

*Primary Examiner*—Christina Y Leung
(74) *Attorney, Agent, or Firm*—Richard C. Litman (57) ABSTRACT

A real time fiber optic matrix switch includes at least one matrix switch port and a controller card. The controller card is configured to recognize communication protocols associated with any of the Type A-H and J signals of the Naval Tactical Data System (NTDS), and to enable the communication of information between the matrix switch and interconnected peripheral devices, as well as any interconnected matrix switches. The controller card is externally programmed by a digital logic program that multiplexes data streams of received signal types to one data stream, converts the multiplexed data stream to an optical signal, transmits the optical signal, receives the transmitted optical signal, transforms the received optical signal to an electric signal, demultiplexes the electric signal, validates the demultiplexed electric signal, and acknowledges the validated demultiplexed electric signal.

13 Claims, 8 Drawing Sheets

REAL TIME FIBER OPTIC MATRIX SWITCH INTERCONNECTION

BACKGROUND OF THE INVENTION

1. Field of the Invention

The present invention relates generally to communication systems and, more particularly, to a real time fiber optic matrix switch interconnection that mimics the specific system platform or generation of equipment that personnel undergoing training will encounter on a particular ship to which they are being assigned, or into which any new hardware or software being tested and evaluated must be integrated.

2. Description of the Related Art

In combat, a fleet of U.S. Navy ships is frequently involved in close-range offensive and defensive combat. During such close range combat, the shipboard Combat Information Center ("CIC") is the focus of all naval and joint air defense management activity, and is the locus of all rapid, complex tactical decision-making by ship commanders.

The Naval Tactical Data System ("NTDS") is an electronic shipboard combat data communication system that is used by the various on-board computers, sensors, and weapon systems to communicate with each other. This data communication system provides naval commanders in the shipboard CIC with a broad picture of the current tactical situation facing them, and helps them coordinate fleet air defense, antisubmarine warfare, and surface defense operations. The NTDS ties together, via directly cabled digital data links, various shipboard missile and gun weapons systems and many other shipboard functions into a single computerized entity comprised of high-speed digital computers, transmitters, receivers, cryptographic equipment, long range radars and sensors, magnetic tapes, disk drives, and various computer monitors and consoles (the "NTDS Peripheral Devices"). This integrated NTDS entity enables commanders to track friendly and hostile contacts from the CIC, and to transmit this information to other shipboard elements and to other units. Through this process, NTDS empowers commanders in the modern, complex, multi-threat combat environment to deal with the massive number of hostile targets and the compressed reaction times that typify modern naval warfare.

Figure 6:
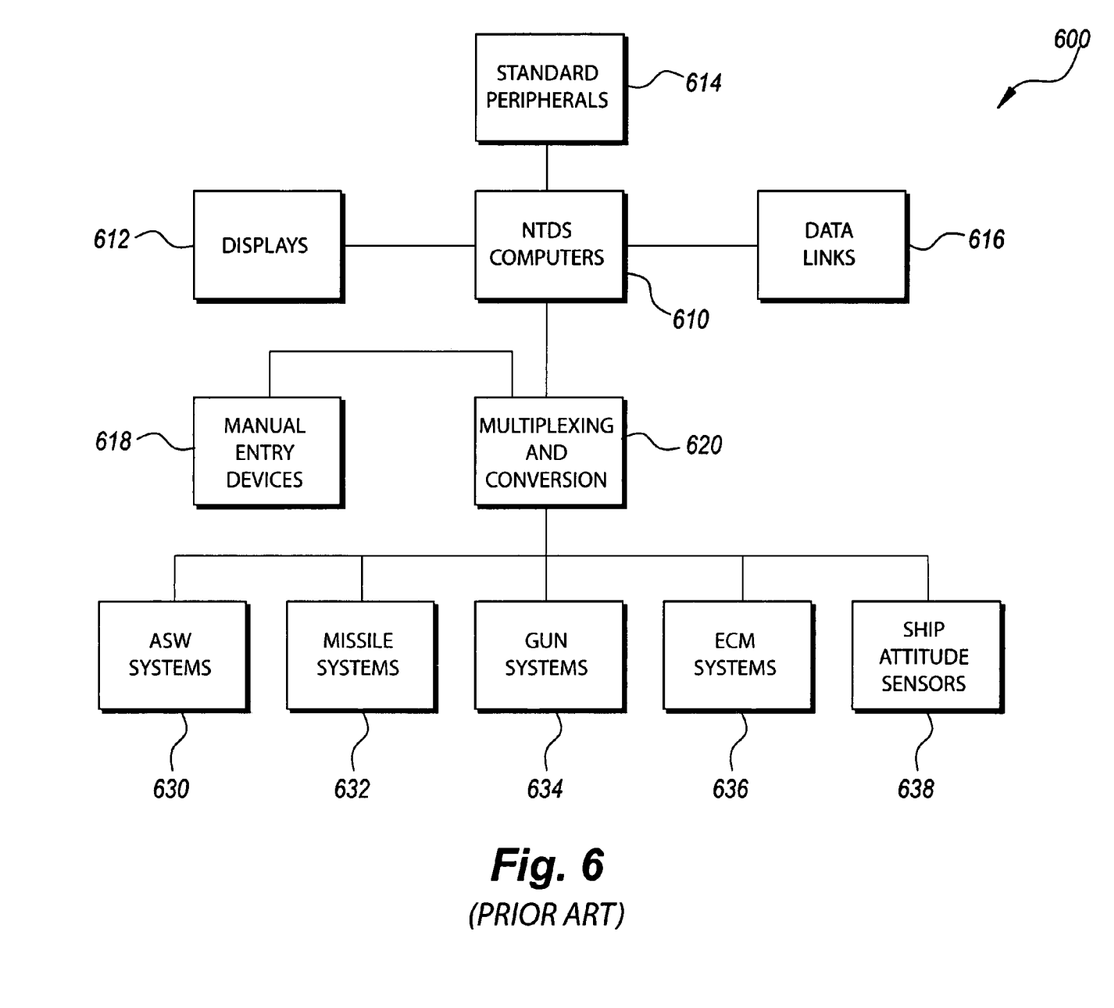
FIG. 6 is a block diagram of a conventional Naval Tactical Data System (NTDS).

A typical NTDS 600 is illustrated in FIG. 6. The NTDS 600 includes NTDS computers 610, displays 612, standard peripherals 614, data links 616, manual entry devices 618, multiplexing and conversion elements 620, anti submarine warfare (ASW) systems 630, missile systems 632, gun systems 634, electronic countermeasures (ECM) systems 636, and ship attitude sensors 638.

In order for all U.S. Navy NTDS Peripheral Devices to communicate through a NTDS, a series of standards have evolved that apply to all NTDS subsystems. These standards and protocols embrace a point to point communications specification that is employed by nearly all of the Navy's NTDS Peripheral Devices to enable them to "talk" to the tactical "host" computers. The NTDS communication standards are divided into nine data types or classifications, all with differing data transfer speeds, methods, and control signals, and with further internal classifications depending upon whether the NTDS signal being transmitted is from computer to computer, computer to Peripheral Device, or Peripheral Device to Peripheral Device (collectively, the NTDS "Data Languages"). For specific information of each NTDS type, refer to MIL-STD-1397 (NAVY), the latest version of which is MIL-STD-1397C, is available from the Naval Publications and Forms center, Philadelphia, Pa., or at http://www.dodssp.daps.mil. MIL-STD-1397 is incorporated herein by reference.

The AEGIS weapons system, first employed in the early 1980s, is the most modern evolution of the NTDS concept, integrating state-of-the-art radar and missile systems. The missile launching system, the computer programs, the radar and the displays are completely integrated to work together to defend against advanced air, surface, and subsurface threats. AEGIS-equipped ships are capable of simultaneously engaging and defeating enemy aircraft, missiles, submarines, and surface ships, and are key elements in the Navy's modern carrier and battleship battle groups.

Different types of ships, however, incorporate a different mix of NTDS weapons and related subsystems. Moreover, the Navy's fleet also exhibits different generational phases or evolutions of NTDS system implementation within the same or similar vessel classes. These configurations are commonly referred to as "Baselines". These circumstances present the Navy with significant command, control, and personnel training, qualification, and simulation challenges. The Navy must insure that commanders and crew rotating for assignment to ships that have different equipment configurations are able to undergo shore-based training, qualification and simulation on the precise technology and/or equipment configuration that they will face on board ship. Moreover, Navy commanders must continually test and evaluate new hardware and software for potential integration into already existing NTDS configurations and older generation equipment.

This circumstance requires the Navy, when conducting shore-based training, qualification, simulation, testing, and evaluation, to have the ability to easily and rapidly reconfigure its training equipment and facilities to mimic the specific system platform or generation of equipment that the personnel undergoing training will encounter on the particular ship to which they are being assigned, or into which any new hardware or software being tested and evaluated must be integrated. The wide range of existing hardware and software configurations render it impractical and cost prohibitive to maintain separate systems for all fielded versions. The constituent elements of these shore-based training facilities and equipment that must be constantly configured and reconfigured to mimic a specific on-board system are sometimes located at disparate physical locations at the shore installation involved. Thus, in addition to being electrically reconfigured, these shore-based facilities and equipment must have the capability to be electrically linked at distances that far exceed the normal capability of NTDS data cables. Whatever the extent of physical separation among these constituent configuration elements, the resulting configuration still must electronically mimic a particular vessel's shipboard system to facilitate realistic training, evaluation, qualification, and simulation.

Previous technology for achieving this electronic "linking together" of disparately located shore-based training equipment has proved unsatisfactory to the Navy. The monumental size, length, and amount of cable required to connect the various pieces of equipment comprising a specific NTDS shipboard configuration's weapons systems, computers, transmitters, receivers, cryptographic equipment, radars, sensors, magnetic tapes, disks, displays and consoles is unwieldy. Earlier techniques also were prone to generating delays in receipt of data between sender and recipient components that destroyed the instant, "real time" mimicry of shipboard systems that the tactical computer programs require to function properly, and that are so important to the training that occurs in these facilities. There was also an accompanying degradation in signal integrity that further diminished the capability of the electronic configuration to adequately mimic its shipboard counterpart.

The related art is represented by the following references of interest.

U.S. Pat. No. 6,023,752, issued on Feb. 8, 2000 to William M. Huttle, describes a program driver that allows for the exchange of information between an NTDS device and a device having a bus topology, especially a VMEbus. The program driver utilizes chain commands which are fully programmable at the user level. The processor itself is programmed at the register level to assure the fastest data rate possible across the VMEbus. The processor driver is invisible to the user. The Huttle patent does not suggest a real time fiber optic matrix switch connection according to the claimed invention.

U.S. Pat. No. 6,269,114 B1, issued on Jul. 31, 2001 to Robert M. Paterno, describes a monitor that presents a negligible load to a hardwired interface, provides electrical isolation between all of the interconnected equipment, adds no significant delay to the interface data, provides for maximum reliability of interface operation, provides for remote operation of the monitoring function, provides for noise immune reception of interface data, maintains interface controlled impedance, provides for ease of installation, and does not perturb system operation in any significant way. The Paterno '114 patent does not suggest a real time fiber optic matrix switch connection according to the claimed invention.

U.S. Pat. No. 6,366,562 B1, issued on Apr. 2, 2002 to Robert M. Paterno, describes a monitor that is used to transmit data being exchanged over an NTDS Type E interface to an instrumentation system. The monitor is electrically isolated from the instrumentation system and includes a directional coupler that passes and inhibits selected data to and from the instrumentation system. The Paterno '562 patent does not suggest a real time fiber optic matrix switch connection according to the claimed invention.

U.S. Pat. Nos. 6,426,952 B1 and 6,526,048 B1, issued on Jul. 30, 2002 and Feb. 25, 2003, respectively, to Harry F. Francis et al., describe a multi-interface point-to-point switching system that includes a plurality of I/O ports coupled to a plurality of respective devices, and a switching fabric that selectively delivers each of a plurality of different signals from a selected one of the I/O ports coupled to a sending one of the devices to another selected one of the I/O ports coupled to a receiving one of the devices, to thereby establish respective connections between the sending and receiving devices. The Francis et al. '952 and '048 patents do not suggest a real time fiber optic matrix switch connection according to the claimed invention.

None of the above inventions and patents, taken either singly or in combination, is seen to describe the instant invention as claimed. Thus a real time fiber optic matrix switch interconnection solving the aforementioned problems is desired.

SUMMARY OF THE INVENTION

The present invention is a real time fiber optic matrix switch interconnection that mimics the specific system platform or generation of equipment that personnel undergoing training will encounter on a particular ship to which they are being assigned, or into which any new hardware or software being tested and evaluated must be integrated to facilitate realistic training, evaluation, qualification, and simulation.

A matrix switch according to the invention includes a chassis housing with a front side and a rear side. The matrix switch includes a collection of NTDS-specific electronic equipment that contains anywhere from 32 to 128 separate ports into which can be connected an equal number of separate NTDS shipboard configuration computers and peripheral devices for linking with NTDS/AEGIS computers and peripheral devices at another locale, or multiple locales. The physical separation between locales can range from being immediately adjacent to being many kilometers apart. The computers and peripheral devices at the distant locales are connected to their own separate NTDS matrix switch, and the various matrix switches involved in the configuration are, in turn, interconnected by fiber optic cables.

The matrix switch includes a controller card with logic chips and circuitry to monitor and manage data transmission between the matrix switch and any interconnected peripheral devices and/or any interconnected matrix switches by prioritizing the order and the manner in which the peripheral devices and/or matrix switches take over and access communication buses on the controller card. The controller card is configured to recognize the communication protocols associated with any of the Type A-H and J signals of the NTDS, and to enable the communication of information between the matrix switch and interconnected peripheral devices, as well as interconnected matrix switches.

The logic chips and circuitry on the controller card may be implemented using Application Specific Integrated Circuits (ASICs) and/or Field Programmable Gate Arrays (FPGAs). The controller card includes an input signal interface, a control logic interface, an output signal interface and a communication bus. The input signal interface is configured to receive input data through the communication bus. The control logic interface contains on-card control logic through which control and configuration information is received from a controller module via the communication bus. The output signal interface is configured to send output signals out of the matrix switch.

The logic chips and circuitry on the controller card contain millions of transistors that are configured into a specific array and externally programmed by a digital logic program, or algorithm. The controller card transistor array and algorithm enable each device connected to any matrix switch within the configuration to respond to any other constituent device connected to any other matrix switch within the configuration, wherever physically located, as if the devices were directly connected by cable and wire on the specific ship. The digital logic program transforms the NTDS signal emanating from the sending device into, first, an electrical signal that reduces to one data stream (i.e. "multiplexes") the separate channels of data emerging from the various devices into the matrix switch ports to which they are connected, and, then, into an optical signal, before causing the signal from the sender switch to be transmitted to the recipient switch over the connecting fiber optic cable. The recipient switch, with a similar type of controller card, then transforms the optical signal received back into an electrical signal, causing the discrete, individual data streams to be separated from each other (i.e. "demultiplexing"), and then transforms the separated data streams back into standardized NTDS digital language for receipt by each recipient device.

Accordingly, it is a principal aspect of the invention to provide a real time fiber optic matrix switch including at least one matrix switch port and a controller card configured to recognize communication protocols associated with any of the Type A-H and J signals of the NTDS, and to enable the communication of information between the matrix switch and interconnected peripheral devices, as well as any interconnected matrix switches.

It is another aspect of the invention to provide a real time fiber optic matrix switch including a controller card externally programmed by a digital logic program that multiplexes data streams of received signal types to one data stream, converts the multiplexed data stream to an optical signal, transmits the optical signal, receives the transmitted optical signal, transforms the received optical signal to an electric signal, demultiplexes the electric signal, validates the demultiplexed electric signal, and acknowledges the validated demultiplexed electric signal.

It is an aspect of the invention to provide improved elements and arrangements thereof in a real time fiber optic matrix switch interconnection for the purposes described which is inexpensive, dependable, and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a real time fiber optic matrix switch interconnection. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Figure 1:
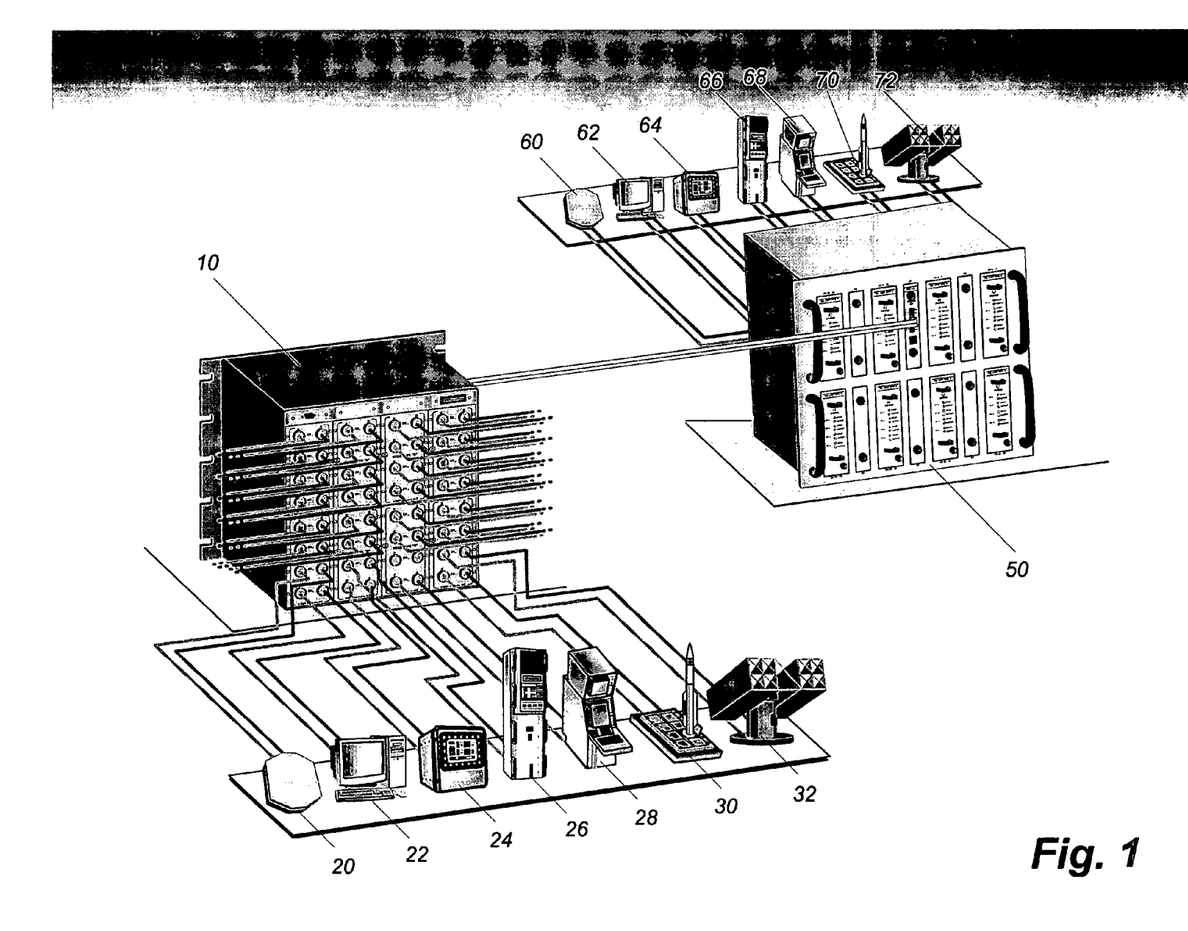
FIG. 1 is perspective view of a real time fiber optic matrix switch interconnection according to the present invention.

Referring to the drawings, FIG. 1 illustrates a real time fiber optic matrix switch interconnection between two inventive matrix switches 10 and 50 configured according to the invention. The arrangement shown in FIG. 1 is representative of two shore-based training facilities located at disparate physical locations that are interconnected with a real time fiber optic matrix switch interconnection that can easily mimic specific on-board systems so that personnel undergoing training may encounter systems on a particular ship to which they are being assigned, or into which any new hardware or software being tested and evaluated must be integrated to facilitate realistic training, evaluation, qualification, and simulation.

The present invention is able to link these various pieces of NTDS shore-based equipment together to achieve real time mimicry of designated shipboard equipment configurations without excessive cable and space costs associated with existing, competing technology, and without incurring additional transmission time latency or causing a loss in signal integrity that routinely accompanies the competing technologies.

The matrix switch 10 is interconnected to radar and sonar equipment 20, computer control equipment 22, storage devices 24, data processing units 26, operator consoles 28, VLS weapon systems 30, and GMLS weapon systems 32. The matrix switch 50 is interconnected to radar and sonar equipment 60, computer control equipment 62, storage devices 64, data processing units 66, operator consoles 68, VLS weapon systems 70, and GMLS weapon systems 72. Each of these devices is configured for utilizing one or more of nine data types or classifications according to NTDS communication standards as set forth in MIL-STD-1397.

As described above, the NTDS input/output interface (MIL-STD-1397) is a versatile military tactical data format 20 designed to transfer either parallel or serial formatted data, depending on the type of computer and its I/O requirements. This interface specifies three I/O control and data signal categories. The categories include: Category I—Computer to external device; Category II—Computer to computer, intercomputer (IC); and Category III—External device to external device. Within this standard, there are nine types of formats (A through H and J). They include both serial and parallel formats as described in the following paragraphs.

TYPE A (NTDS) SLOW. Type A transfers parallel data at up to 41,667 words per second in each direction. This interface type uses nominal voltages of 0 vdc (logical one) and −15 vdc (logical zero) to transmit word bit-groupings of 16, 30, or 32 bits, depending on the type of computer and application. Type A can transmit digital signals up to 300 feet over twisted pair copper cables depending on the type of cable used. Type A uses a request and acknowledge protocol process that requires very fast response times to maintain maximum throughputs. It transfers control and data words using two cables: one input and one output for the same channel although a few devices may use input only or output only. Type A signal designations for input and output include external interrupt enable (EIE), input data request (IDR), external interrupt request (EIR), input data acknowledge (IDA), external function request (EFR), external function acknowledge (EFA), output data request (ODR), and output data acknowledge (ODA).

TYPE B (NTDS) FAST. Type B transfers parallel data at up to 250,000 words per second in each direction. This type interface uses nominal voltages of 0 vdc (logical one) and −3 vdc (logical zero) to transmit word bit-groupings of 16, 30, or 32 bits depending on the type of computer and application. Type B can transmit digital signals up to 150 feet over twisted pair copper cables depending on the type of cable used. Type B uses a request and acknowledge protocol process that requires very fast response times to maintain maximum throughputs. It transfers control and data words using two cables: one input and one output for the same channel although a few devices may use input only or output only. Type B uses the same eight input and output signal designations as type A.

TYPE C (ANEW). Type C transfers parallel data of up to 250,000 words per second in each direction. This type of interface uses nominal voltages of 0 vdc (logical one) and +3.5 vdc (logical zero) to transmit word bit-groupings of 16, 30, or 32 bits, depending on the type of computer and application. Type C can transmit digital signals up to 250 feet over twisted pair copper cables depending on the type of cable used. Type C uses a request and acknowledge protocol process that requires very fast response times to maintain maximum throughputs. It transfers control and data words using two cables: one input and one output for the same channel although a few devices may use input only or output only. Type C uses the same eight input and output signal designations as type A.

TYPE D (HIGH LEVEL SERIAL). Type D asynchronously transfers serial data at ten megabits per second (Mbps) over coaxial cable. This type of interface uses bipolar (Manchester) pulses of a nominal voltage of +/−3.25 vdc to transmit a logical one or logical zero. Type D can transmit digital signals up to 1000 feet over coaxial copper cables depending on the type of cable used. A Type D interface consists of an output function (source or SOS) connected to an input function (sink or SIS). Two cables are required for bidirectional communications, a source line (computer to peripheral) and a sink line (peripheral to computer). The source line is used to transmit output data and external functions, while the sink line is used to transmit input data and external interrupt codes. The signals required for input transfer will occur on the input channel (input request, input enable, and not ready) and the signals required for output transfer will occur on the output channel (output request, output enable, and not ready).

TYPE E (LOW LEVEL SERIAL). Type E asynchronously transfers serial data at ten megabits per second (Mbps) on triaxial cable. Channel control is similar to NTDS parallel channels. This type interface uses bipolar (Manchester) pulses of a nominal voltage of ±0.6 vdc. Type E can transmit digital signals up to 1,000 feet over triaxial copper cables depending on the type of cable used. Interfacing with an external device uses a normal serial I/O interfacing: enable and request. The channel interface uses a SIS/SOS protocol, transferring control and data words using the following word transfers: external function, output data, external interrupt, and input data. The data (command or data) words are transmitted in serial bursts of up to thirty-two 32-bit words (1,024 bits). The burst transmissions are coordinated using Sink Status (SIS) frames or Source Status (SOS) frames. The SIS frame is sent from the receiving device when it is ready to receive a burst. The SOS frame is sent by the transmitting device to inordinate and synchronize the burst transmission.

TYPE F (AIRCRAFT INTERNAL TIME DIVISION MULTIPLEX (TDM) BUS). Type F transfers serial data up to one million bits per second over a distance of 300 feet. Data will be transmitted as bipolar coded (Manchester) pulses to represent a logical one or logical zero. This type of interface transmits serial bit groupings of twenty bits: data, sync waveform, and parity bit. Type F uses a command/response protocol. Transfers include command, data, and status words over a single channel. Type F is not a point to point connection, but allows multiple devices to be connected on a common bus. This interface can handle up to thirty-two external devices on one bus channel, but one device must be configured as the bus controller.

TYPE G (RS-449). Type G equates with the functional and procedural portions of RS-232. However, the electrical and mechanical specifications are covered by RS-422. Type G is intended to transfer serial data above twenty kilobits per second and up to two million bits per second over a single cable. Type G can transmit data up to 200 feet. Signals are divided between 37-pin and 9-pin connectors, and the ground and common signals are handled separately for each cable. Type G can send asynchronous serial data up to 9600 bits per second. This type of interface is used to transmit bit groupings of 8, 16, or 32 bits depending on the type of computer. Type G can be used in mainframe and microcomputers. Type G uses primarily a command and response protocol.

TYPE H (HIGH-SPEED PARALLEL). Type H transfers parallel data of up to 500,000 words per second in each direction. This type interface uses nominal voltages of zero vdc (logical one) and +3.5 vdc (logical zero) to transmit bit groupings of 16, 30, or 32 bits depending on the type of computer and application. Type H can transmit digital signals up to 250 feet over twisted pair copper cables depending on the type of cable used. Type H uses a request and acknowledge protocol process that requires very fast response times to maintain maximum throughputs. It transfers control and data words using two cables: one input and one output for the same channel although a few devices may use input only or output only. It can also interface with external equipment having a type C interface. Type H uses the same input and output signal designations as type A.

TYPE J (FIBER OPTIC NATO SERIAL). Type J is used for the fiber optic implementation of type E. A type J fiber optic channel converts a type E serial bit stream into light pulses that are carried by a fiber optic cable to a receiving device that converts the light pulses back into a digital bit stream.

Figure 2A:
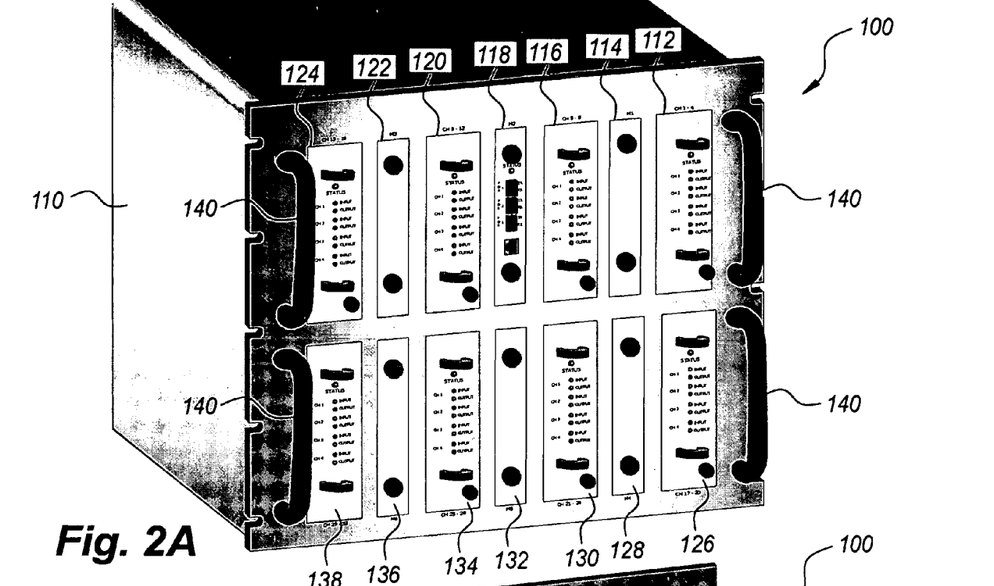
FIG. 2A is a front perspective view of a real time fiber optic matrix switch according to the present invention.
Figure 2B:
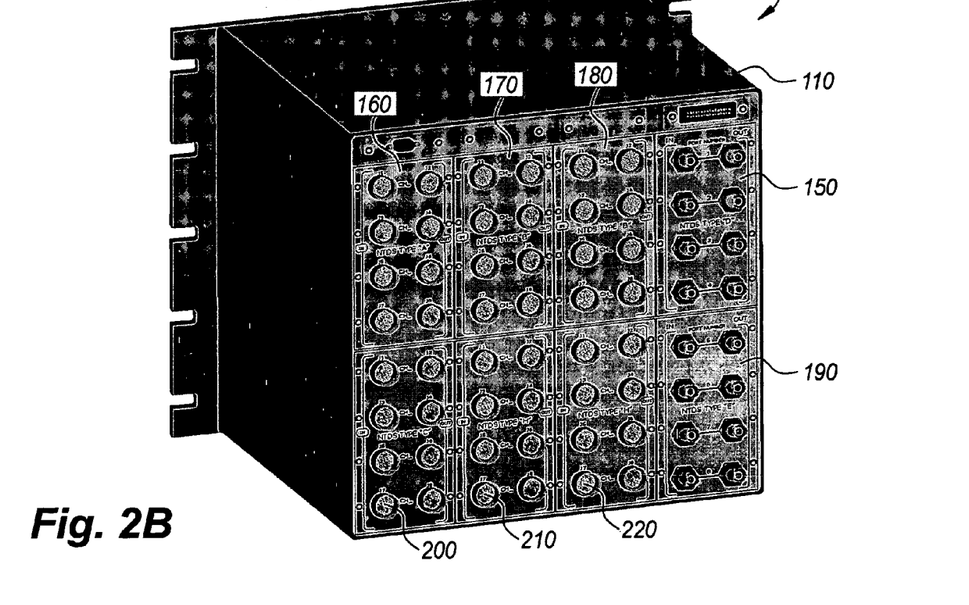
FIG. 2B is a rear perspective view of a real time fiber optic matrix switch according to the present invention.

Referring to FIGS. 2A and 2B, a matrix switch 100 according to the invention includes a chassis housing 110 with a front side and a rear side. The matrix switch 100 includes a collection of NTDS-specific electronic equipment that contains anywhere from 32 to 128 separate ports into which can be connected an equal number of separate NTDS shipboard configuration computers and peripheral devices for linking with NTDS/AEGIS computers and peripheral devices at another locale, or multiple locales. The physical separation between locales can range from being immediately adjacent to being many kilometers apart. The computers and peripheral devices at the distant locales are connected to their own separate NTDS matrix switch 100, and the various matrix switches 100 involved in the configuration are, in turn, interconnected by fiber optic cables.

The matrix switch 100 includes a controller card with logic chips and circuitry to monitor and manage data transmission between the matrix switch 100 and any interconnected peripheral devices and/or any interconnected matrix switches 100 by prioritizing the order and the manner in which the peripheral devices and/or matrix switches take over and access communication buses on the controller card. The controller card is configured to recognize the communication protocols associated with any of the Type A-H and J signals of the NTDS, and to enable the communication of information between the matrix switch 100 and interconnected peripheral devices, as well as interconnected matrix switches 100.

The logic chips and circuitry on the controller card may be implemented using Application Specific Integrated Circuits (ASICs) and/or Field Programmable Gate Arrays (FPGAs). The controller card includes an input signal interface, a control logic interface, an output signal interface and a communication bus. The input signal interface is configured to receive input data through the communication bus. The control logic interface contains on-card control logic through which control and configuration information is received from a controller module via the communication bus. The output signal interface is configured to send output signals out of the matrix switch 100.

The logic chips and circuitry on the controller card contain millions of transistors that are configured into a specific array and externally programmed by a digital logic program, or algorithm. The controller card transistor array and algorithm enable each device connected to any matrix switch 100 within the configuration to respond to any other constituent device connected to any other matrix switch 100 within the configuration, wherever physically located, as if the devices were directly connected by cable and wire on the specific ship.

The digital logic program transforms the NTDS signal emanating from the sending device into, first, an electrical signal that reduces to one data stream (i.e. "multiplexes") the separate channels of data emerging from the various devices into the matrix switch ports to which they are connected, and, then, into an optical signal, before causing the signal from the sender switch to be transmitted to the recipient switch over the connecting fiber optic cable. The recipient switch, with a similar type of controller card, then transforms the optical signal received back into an electrical signal, causing the discrete, individual data streams to be separated from each other (i.e. "demultiplexing"), and then transforms the separated data streams back into standardized NTDS digital language for receipt by each recipient device.

The net result of these NTDS data code transformations is that one device within the configuration, wherever located, can speak almost instantaneously to another device within the configuration, without loss of signal integrity and without data being incorrectly channeled to another device within the configuration. Each device electronically "believes" that it is individually connected to every other device within the configuration with which it must communicate in a combat environment, thereby mimicking the shipboard configuration reality.

The controller card transistor array and programmed algorithm facilitate the instantaneous transmission in one data stream over the fiber optic connection between matrix switches 100 of all of the various NTDS Data Languages utilized by devices and equipment involved in a particular NTDS shipboard configuration. Although all of these signals in differing Data Languages are intermixed in the same data stream when transmitted, the programmed algorithm employed in the matrix switch controller cards enables those signals to be received by the intended recipient device in precisely the Data Language that the sender device intends and the recipient device expects, almost instantaneously, without loss of signal and without adulteration by data transmissions intended for another device within the selected configuration.

Figure 4A:
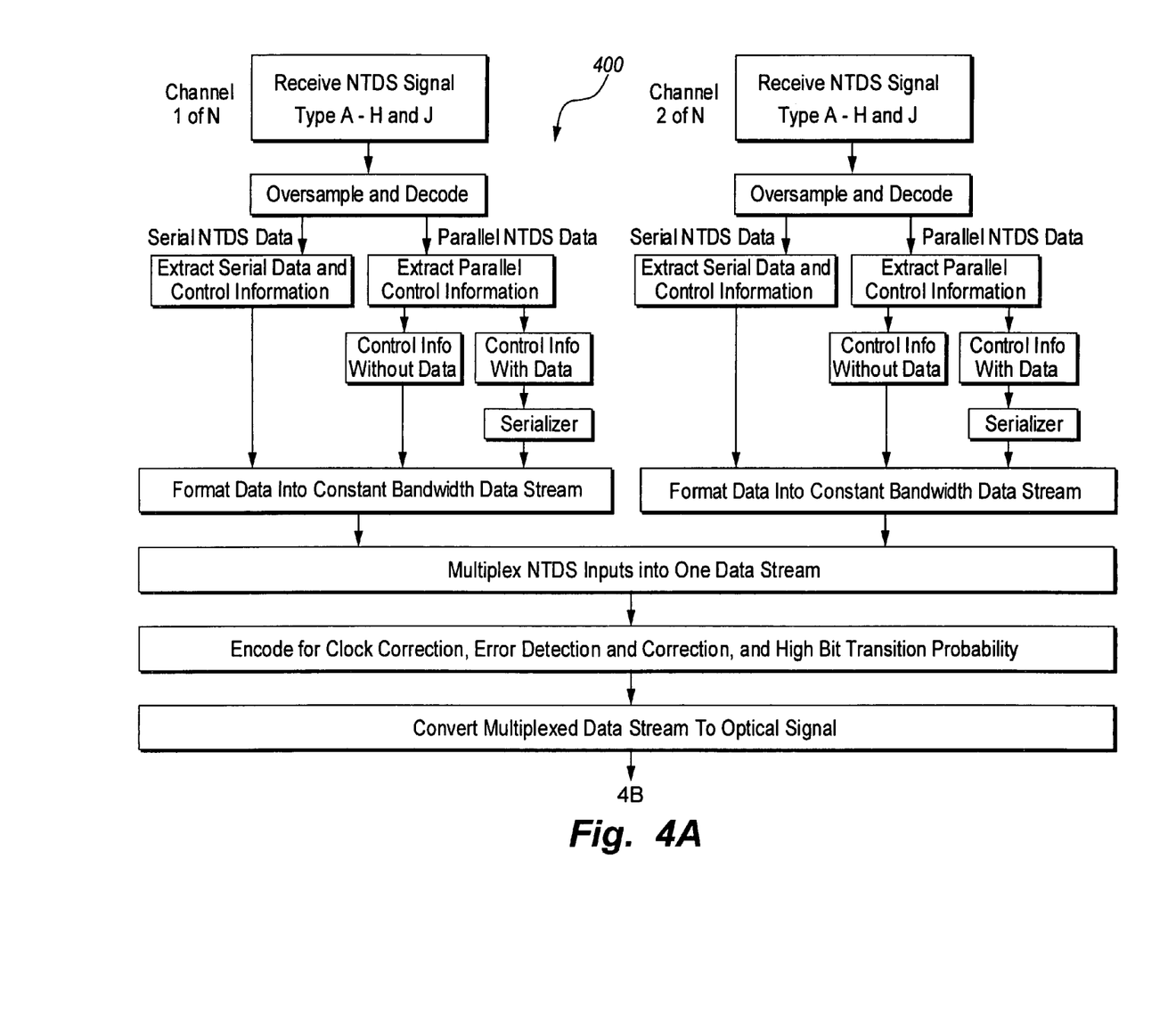
FIGS. 4A, 4B, and 4C are a flow chart of a real time fiber optic matrix switch interconnection according to the present invention.
Figure 4B:
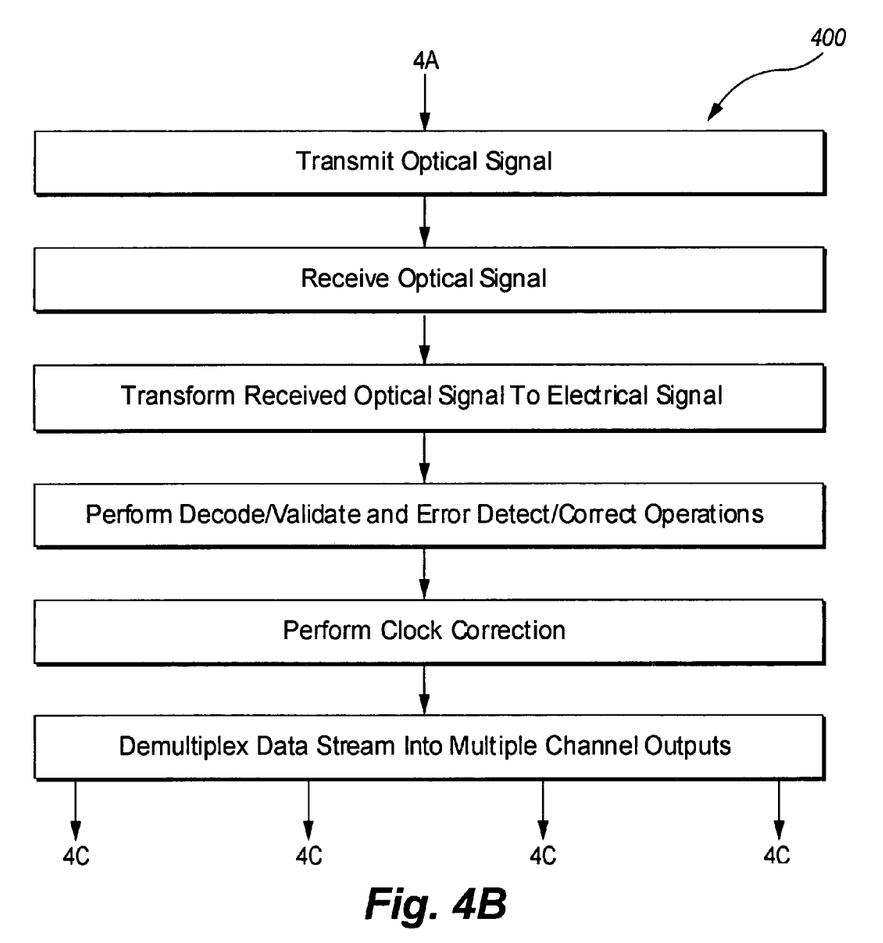
Figure 4C:
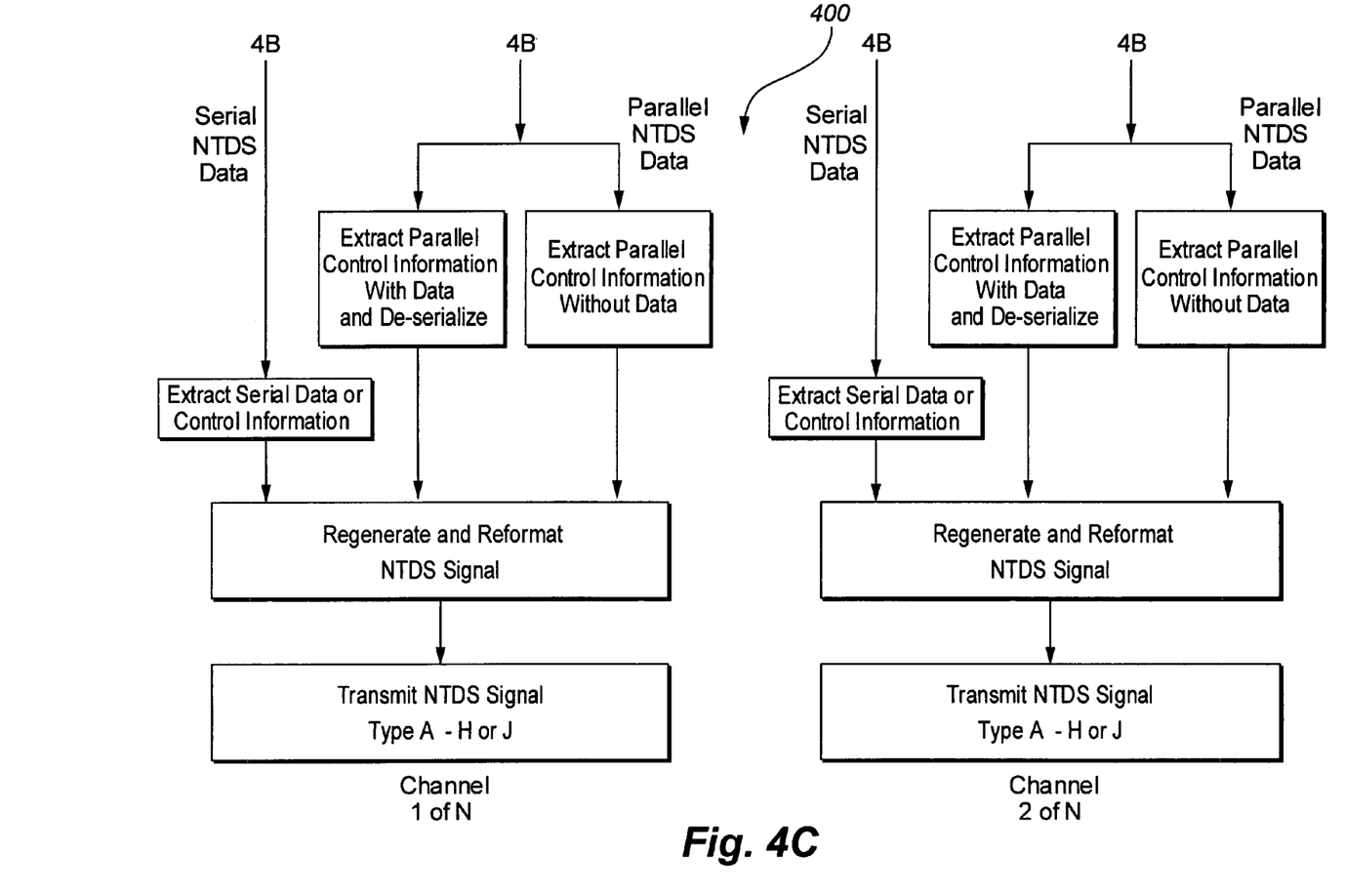

FIGS. 4A-4C show a flow chart of real time communication between two interconnected matrix switches according to the invention. Initially, any number of NTDS signal Types A-H and J are received by a matrix switch (two channels are shown as examples). The received NTDS signal types are oversampled and decoded. Serial NTDS data and control information is extracted from the oversampled and decoded serial NTDS signals. Parallel control information with and without data is extracted from oversampled and decoded parallel NTDS signals. Control information with data is serialized. The extracted serial data and control information, the extracted parallel control information without data, and the extracted and serialized parallel control information with data is formatted into a constant bandwidth data stream, and is then multiplexed into one data stream. The multiplexed NTDS inputs from multiple channels are encoded for clock correction, error detection and correction, and high bit transition probability. The multiplexed data stream is then converted to an optical signal. The optical signal is transmitted and received, and is then transformed to an electrical signal.

Decode/validate and error detect/correct operations are then performed. Clock correction is performed and the data stream is then demultiplexed into multiple channel outputs. Serial NTDS data is then processed to extract serial data or control information. Parallel NTDS data is also processed to extract parallel control information with data, and is de-serialized, and parallel control information without data is extracted. The extracted serial data or control information from the serial NTDS data, the extracted and de-serialized parallel control information with data from the parallel NTDS data, and the extracted parallel control information without data is then regenerated and reformatted into an NTDS signal, and is then transmitted.

The matrix switch 100 provides ultra-low latency, transparent, non-blocking interconnection between any pair of peripheral devices. The matrix switch 100 enables NTDS networks to be rapidly reconfigured using an intuitive and user friendly graphical user interface control system. The matrix switch 100 delivers demonstrated bit error rates of less than about ten to the minus ten, latency less than about five hundred nanoseconds, and the ability to seamlessly interface with any NTDS device. The matrix switch 100 is modular, very reliable, simple to repair, and requires no routine maintenance.

The matrix switch 100 is configured to enable a fully non-blocking interconnection of up to thirty-two NTDS Type A-H and J devices with a port-to-port latency less than about five hundred nanoseconds. Multiple matrix switches 100 can be connected via high speed fiber optic links to create low latency non-blocking networks with up to one hundred and twenty-eight ports. Each matrix switch 100 can interconnect up to thirty-two NTDS Type A-H and J devices in any port-to-port combination with simultaneous non-blocking full data rate operation on all ports. The ultra-low latency of less than about five hundred nanoseconds improves transparency and maximizes communication data rate. The matrix switch 100 is configured to oversample signals to provide unmatched sensitivity and noise immunity. One hundred percent signal regeneration and active matrix circuitry mitigates effects of long cables.

The front panel of each matrix switch 100 includes a plurality of "hot swap" I/O cards 116 and status indicators to simplify operation and maintenance, and to eliminate the need to ever disconnect signal cables. Standard I/O connectors may be utilized. The matrix switch 100 can be controlled by any type of computer equipped with Graphical User Interface (GUI) software. All I/O and power connectors are on the rear of the chassis to simplify installation. The matrix switch 100 is configured to operate utilizing a standard power connection with a power consumption of less than about fifty watts. A front panel power switch, LED status, and data indicators are positioned on the front of the chassis housing 110. The modular design simplifies maintenance. Connectors can be individually replaced. The chassis is preferably configured to be compatible for a standard 19" rack mount (e.g., about 14"H×15½"D×16⅞"W), and has a weight preferably less than about thirty-five lbs. However, the dimensions and weight attributes may be varied according to the desires of the user. The matrix switch 100 is preferably configured to enable a mean time to replace printed circuit boards and power supplies of less than about five minutes, and less than about thirty minutes for all other components.

Figure 3:
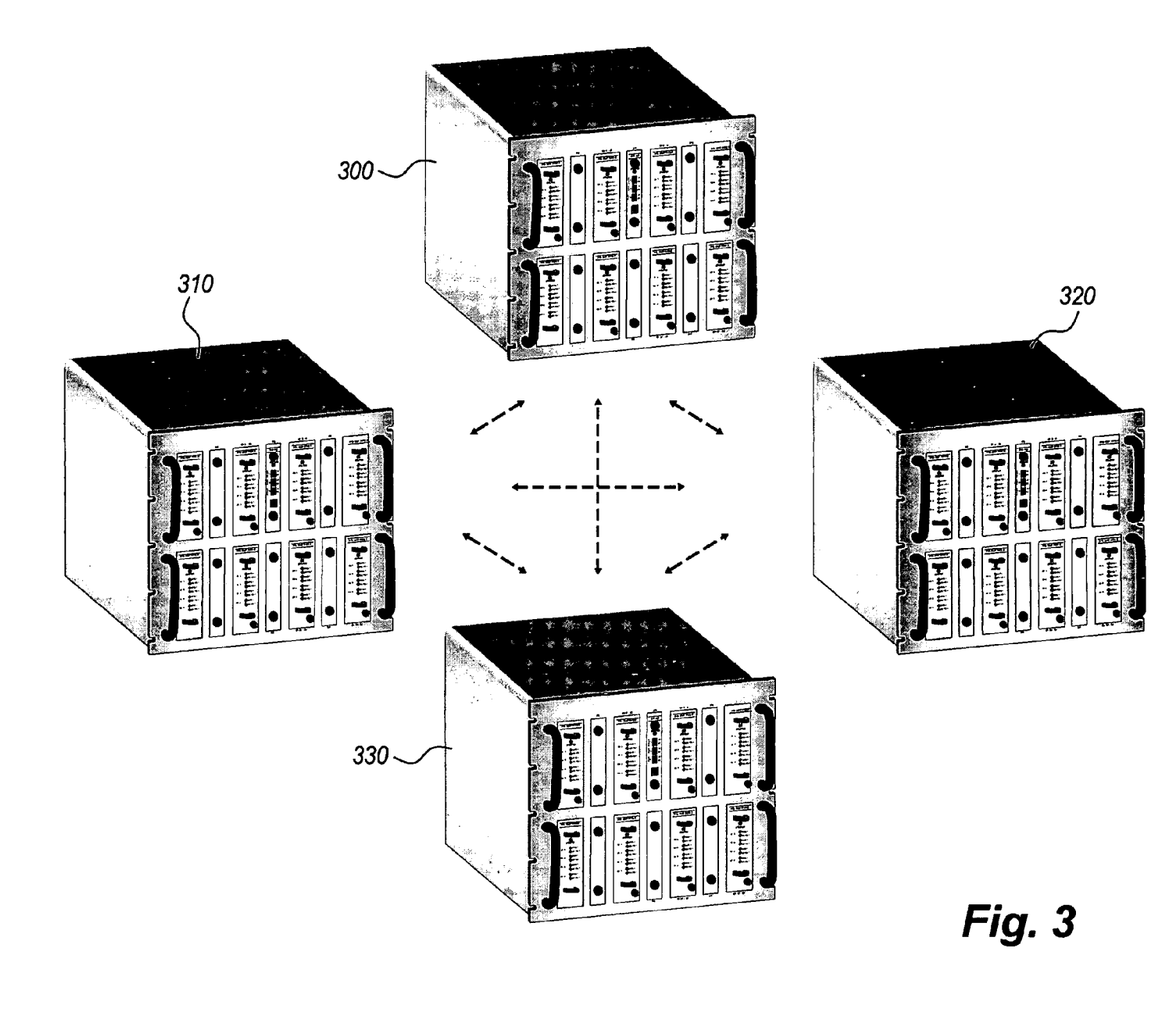
FIG. 3 is a plan view of a real time fiber optic matrix switch interconnection between four matrix switches according to the present invention.

The matrix switch 100 may be configured to allow two matrix switches to be connected by a single high speed fiber optic link to create a low latency, fully non-blocking 64 port matrix switch, and to allow up to four matrix switches to be connected by high speed fiber optic links to create a low latency non-blocking 96 or 128 port matrix switch. FIG. 3 shows four matrix switches 300, 310, 320, and 330 connected by high speed fiber optic links. The matrix switch 100 can directly interface, via a field installable multi-function card, with NTDS devices located fourteen kilometers or more distant using remotely located switch/extenders.

Figure 5:
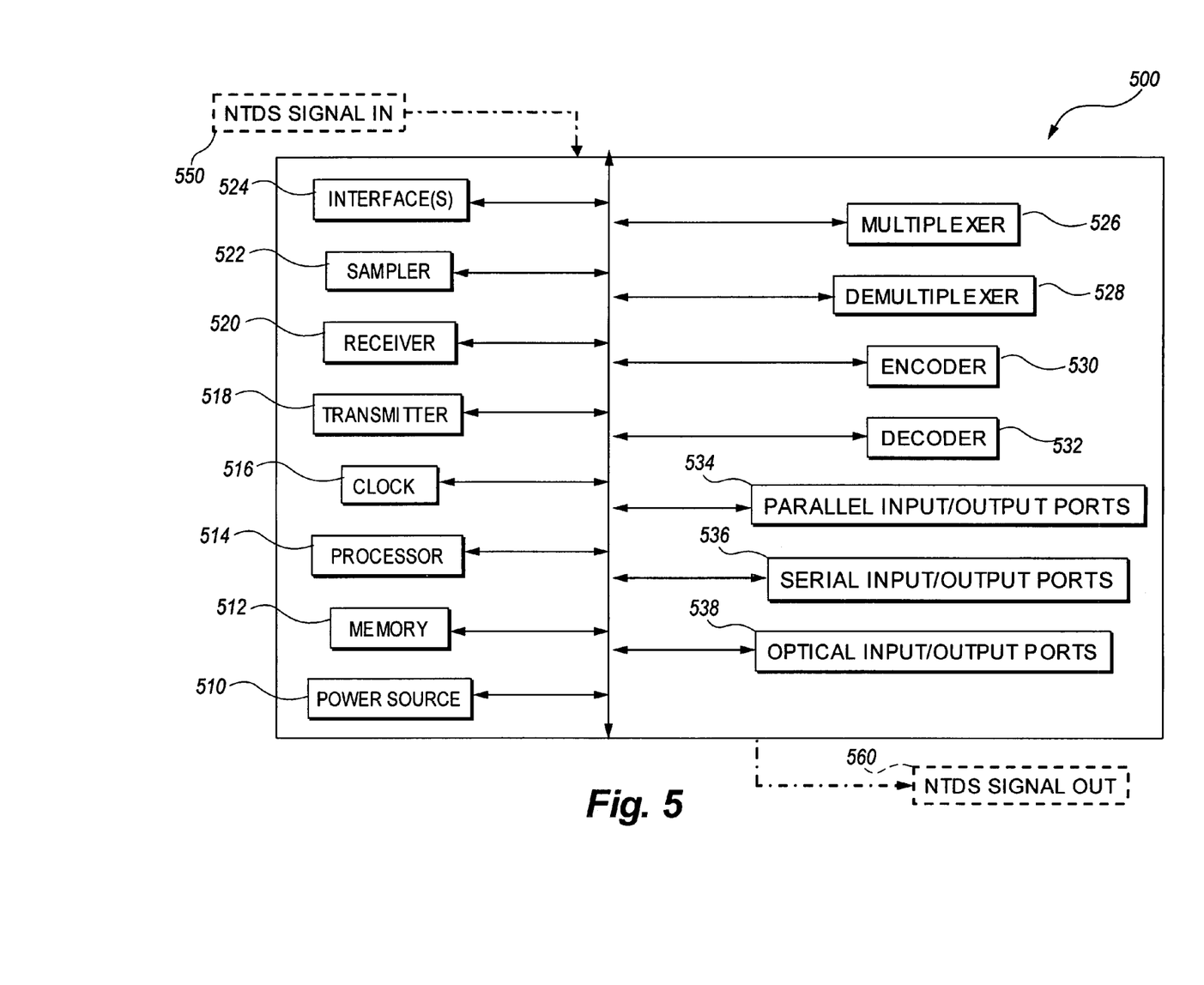
FIG. 5 is a block diagram of a real time matrix switch according to the invention.

FIG. 5 illustrates the components of a matrix switch 500 according to the present invention. The matrix switch 500 includes power source(s) 510, memory(s) 512, a processor(s) 514, a clock(s) 516, a transmitter(s) 518, a receiver(s) 520, a sampler(s) 522, an interface(s) 524 (e.g., switches, buttons, keys, etc.), a multiplexer(s) 526, a demultiplexer(s) 528, an encoder(s) 530, a decoder(s) 532, a parallel input/output port(s) 534, a serial input/output port(s) 536, and an optical input/output port(s) 538, and a communication bus interconnecting all of the components. The matrix switch 500 may also include an antenna.

While the invention has been described with references to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

We claim:

1. A real time fiber optic matrix switch comprising:
    at least one matrix switch port; and
    a controller card configured to recognize communication protocols associated with any of a first format including parallel data at a first speed and at a first voltage, a second format including parallel data at a speed greater than said first speed and at a voltage distinct from said first voltage, a third format including parallel data at a third speed distinct from said first speed and at a third distinct voltage, a fourth format including serial data at a distinct speed from said first, second and third speeds and at a fourth distinct voltage, a fifth format including serial data at a fifth speed distinct from said first, second and third speeds and at a fifth distinct voltage, a sixth format including serial data at a sixth distinct speed, a seventh format including serial data at a seventh distinct speed, an eighth format including parallel data at an eighth distinct speed from said first, second, and third speeds and at a voltage distinct from said first, second, fourth and fifth voltages, and a ninth format including serial data at a ninth speed, wherein said controller card includes logic chips and circuitry comprising an input signal interface, a control logic interface, an output signal interface, and a communication bus, wherein the logic chips and circuitry are externally programmed by a digital logic program that:
        i) multiplexes data streams of said first-ninth formats;
        ii) converts the multiplexed data stream to an optical signal; and
        iii) transmits the optical signal
    and to enable the communication of information between the matrix switch and interconnected peripheral devices, and any interconnected matrix switches.

2. The real time fiber optic matrix switch according to claim 1, wherein said digital logic program further:
    receives the transmitted optical signal;
    transforms the received optical signal to an electric signal; and
    demultiplexes the electric signal.

3. The real time fiber optic matrix switch according to claim 2, wherein said digital logic program further:
    validates the demultiplexed electric signal; and
    acknowledges the validated demultiplexed electric signal.

4. The real time fiber optic matrix switch according to claim 1, further comprising:
    a memory;
    a processor;
    a clock;
    a transmitter;
    a receiver;
    a sampler;
    an interface; and
    a communication bus.

5. The real time fiber optic matrix switch according to claim 4, further comprising:
    a multiplexer; and
    a demultiplexer.

6. The real time fiber optic matrix switch according to claim 4, further comprising:
    an encoder; and
    a decoder.

7. The real time fiber optic matrix switch according to claim 1, further comprising:
    a parallel input/output port;
    a serial input/output port; and
    an optical input/output.

8. A real time fiber optic matrix switch method comprising:
    providing a fiber optic real time matrix switch with at least one matrix switch port and a controller card;
    configuring said controller card to include logic chips and circuitry comprising an input signal interface, a control logic interface, an output signal interface, and a communication bus, wherein the logic chips and circuitry are externally programmed by a digital logic program that:
        i) multiplexes data streams of said first-ninth formats;
        ii) converts the multiplexed data stream to an optical signal; and
        iii) transmits the optical signal
    recognizing communication protocols associated with any of a first format including parallel data at a first speed and at a first voltage, a second format including parallel data at a speed greater than said first speed and at a voltage distinct from said first voltage, a third format including parallel data at a third speed distinct from said first speed and at a third distinct voltage, a fourth format including serial data at a distinct speed from said first, second and third speeds and at a fourth distinct voltage, a fifth format including serial data at a fifth speed distinct from said first, second and third speeds and at a fifth distinct voltage, a sixth format including serial data at a sixth distinct speed, a seventh format including serial data at a seventh distinct speed, an eighth format including parallel data at an eighth distinct speed from said first, second, and third speeds and at a voltage distinct from said first, second, fourth and fifth voltages, and a ninth format including serial data at a ninth speed; and
    communicating information between the matrix switch and interconnected peripheral devices, and any interconnected matrix switches.

9. The real time fiber optic matrix switch method according to claim 8, further comprising:
    receiving the transmitted optical signal;
    transforming the received optical signal to an electric signal; and
    demultiplexing the electric signal.

10. The real time fiber optic matrix switch method according to claim 9, further comprising:
    validating the demultiplexed electric signal; and
    acknowledging the validated demultiplexed electric signal.

11. The real time fiber optic matrix switch method according to claim 8, further comprising:
    providing the matrix switch with a memory, a processor, a clock, a transmitter, a
    receiver, a sampler, an interface, and a communication bus.

12. The real time fiber optic matrix switch method according to claim 11, further comprising:
    providing the matrix switch with a multiplexer, a demultiplexer, an encoder, and a decoder.

13. The real time fiber optic matrix switch method according to claim 11, further comprising:
    providing the matrix switch with a parallel input/output port, a serial input/output port, and an optical input/output port.

* * * * *